(12) United States Patent  
Tuscano et al.

(10) Patent No.: US 8,131,763 B2  
(45) Date of Patent: Mar. 6, 2012

(54) AGE VERIFICATION AND CONTENT FILTERING SYSTEMS AND METHODS

(75) Inventors: Paul Sharad Tuscano, Washington, DC (US); Jesse Elliott Money, Boonsboro, MD (US)

(73) Assignee: Cellco Partnership, Basking Ridge, NJ (US)

( * ) Notice: Subject to any disclaimer, the term of this patent is extended or adjusted under 35 U.S.C. 154(b) by 817 days.

(21) Appl. No.: 11/381,480

(22) Filed: May 3, 2006

(65) Prior Publication Data

US 2007/0260603 A1 Nov. 8, 2007

(51) Int. Cl.
*G06F 17/30* (2006.01)

(52) U.S. Cl. .......................................... 707/783; 725/28

(58) Field of Classification Search .......... 707/781–785; 725/28, 30

See application file for complete search history.

(56) References Cited

U.S. PATENT DOCUMENTS

| 6,785,901 | B1* | 8/2004 | Horiwitz et al. ................. 725/25 |
| 7,140,045 | B2* | 11/2006 | Gudorf et al. .................... 726/28 |
| 2003/0131102 | A1* | 7/2003 | Umbreit ........................ 709/224 |
| 2005/0022229 | A1* | 1/2005 | Gabriel et al. .................. 725/28 |
| 2006/0041508 | A1* | 2/2006 | Pham et al. ..................... 705/50 |
| 2006/0235824 | A1* | 10/2006 | Cheung et al. ..................... 707/1 |
| 2007/0100963 | A1* | 5/2007 | Ban et al. ...................... 709/217 |

* cited by examiner

*Primary Examiner* — Belinda Xue

(57) ABSTRACT

A system and method is provided for age verification and content filtering (AV/CF) on a wireless telecommunications system capable of providing enhanced products such as Internet, WAP, messaging, games, video, music, applications, etc. A profile controls content that is accessible by a user depending upon the user's age or restrictions placed on accessible content in accordance with content categories. Rating information is obtained from content providers and mapped to content categories or content is rated dynamically. User's requests for access may be recorded whether access is provided or denied and used to provide reports including reports to account holders responsible for the user's account. In some instances, attempts to access banned information may be reported to law enforcement officials.

4 Claims, 8 Drawing Sheets

AGE VERIFICATION AND CONTENT FILTERING SYSTEMS AND METHODS

BACKGROUND INFORMATION

The wireless terminal (i.e., handset) is more and more becoming a single-point device for telecommunications, entertainment, messaging, Internet access, data storage, etc. People are beginning to look upon these devices as not a luxury or convenience, but as a necessity. Coupled with the expansion of wireless terminals and their ever-encompassing features, is the growth of their possession and use by teenagers, or even younger children. Because of the use and possession of wireless terminals by younger persons and those offended by certain content that may be available through their terminals, carriers have generally limited content selection and content programming is generally set for mass appeal. In some instances carriers may have legal requirements placed on the content available to wireless terminal account holders.

BRIEF SUMMARY OF THE INVENTION

Presently, even with restricted content available through carriers, there is no way to avoid unwanted content from reaching users who are not of sufficient age or who may find the content offensive. The age verification/content filtering systems and methods of the embodiments according to the present invention allow account holders to filter out or bar access to content they do not want and to customize content access to their preferences. Therefore, carriers may offer a wider selection of content with less associated risks if they offer content filtering and age verification simultaneously, thereby providing enhanced revenue opportunities to the carriers.

Furthermore, the embodiments according to the present invention allow users to make informed choices when accessing content using a wireless handset, including compliance with CTIA—The Wireless Association® "Wireless Content Guidelines," which are a voluntary pledge by the industry to proactively provide tools and controls to manage wireless content offered by the carriers or available via Internet-enabled wireless devices, and with governmental laws and regulations.

BRIEF DESCRIPTION OF THE SEVERAL VIEWS OF THE DRAWING(S)

Reference will be made to the accompanying drawings, which are not necessarily drawn to scale, and wherein.

DETAILED DESCRIPTION OF THE PREFERRED EMBODIMENTS

Figure 1A:
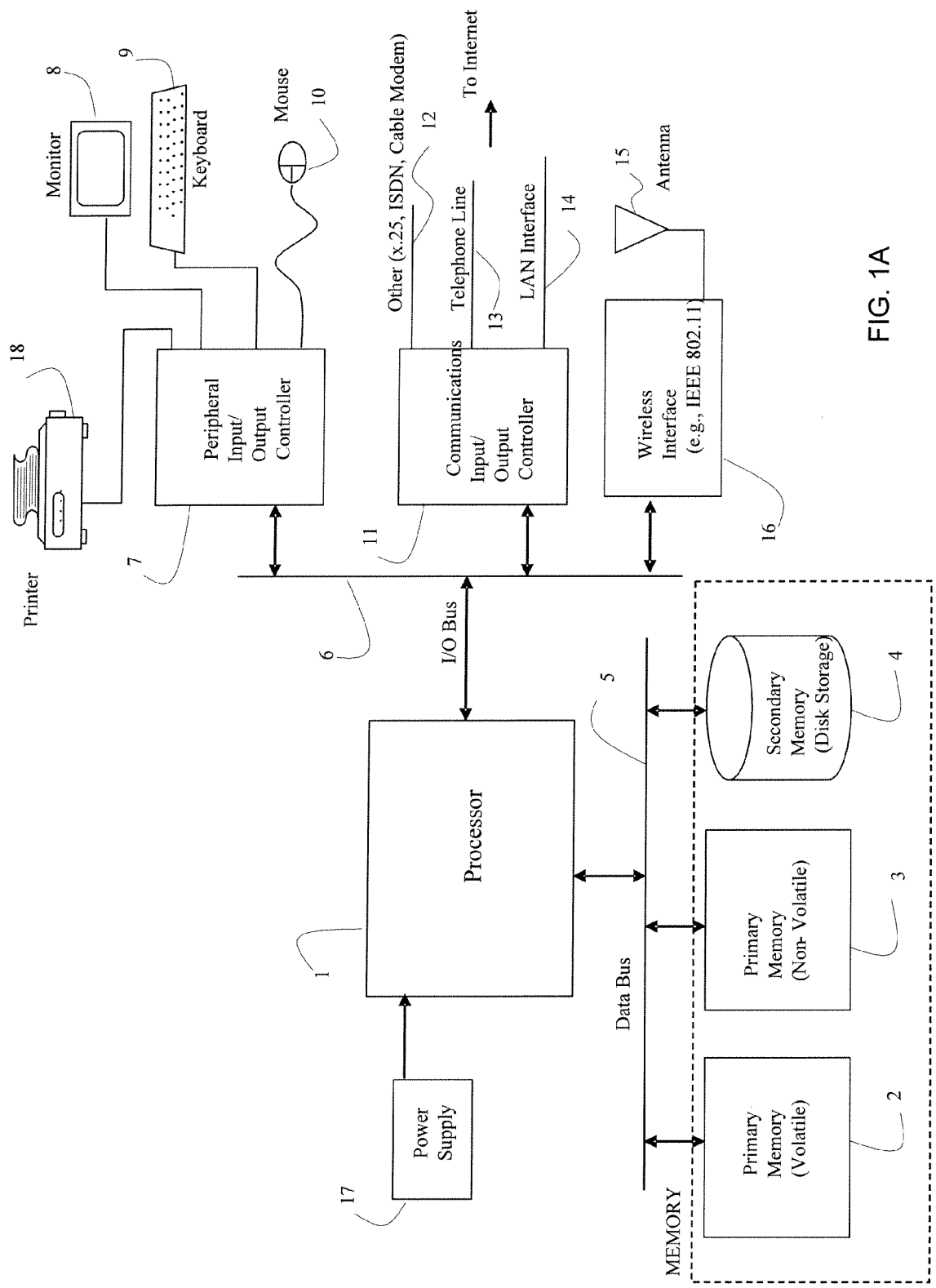
FIG. 1A is an illustration of one embodiment of a computing device that can be used to practice aspects of the present invention.

Preferred embodiments that may be implemented according to the present invention now will be described more fully with reference to the accompanying drawings, in which some, but not all embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

As will be appreciated by one skilled in the art, the preferred embodiment may be implemented as a method, a data processing system, or a computer program product. Accordingly, the preferred embodiment may take the form of an entirely hardware embodiment, an entirely software embodiment, or an embodiment combining software and hardware aspects. Furthermore, implementations of the preferred embodiment may take the form of a computer program product on a computer-readable storage medium having computer-readable program instructions (e.g., computer software) embodied in the storage medium. More particularly, implementations of the preferred embodiments may take the form of web-implemented computer software. Any suitable computer-readable storage medium may be utilized including hard disks, CD-ROMs, optical storage devices, or magnetic storage devices.

The preferred embodiments according to the present invention are described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In the preferred embodiments referenced herein, a "computer" or "computing device" may be referenced. Such computer may be, for example, a mainframe, desktop, notebook or laptop, a hand held device such as a data acquisition and storage device, or it may be a processing device embodied within another apparatus such as, for example, a set top box for a television system or a wireless telephone. In some instances the computer may be a "dumb" terminal used to access data or processors over a network. Turning to FIG. 1A, one embodiment of a computing device is illustrated that can be used to practice aspects of the preferred embodiment. In FIG. 1A, a processor 1, such as a microprocessor, is used to execute software instructions for carrying out the defined steps. The processor receives power from a power supply 17 that also provides power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amounts of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access a wide area network such as the Internet, intranets, LANs, or other data communication facilities.

Finally, the processor 1 may communicate with a wireless interface 16 that is operatively connected to an antenna 15 for communicating wirelessly with another device, using for example, one of the IEEE 802.11 protocols, 802.15.4 protocol, or a standard 3G wireless telecommunications protocols, such as CDMA2000 1x EV-DO, GPRS, W-CDMA, or other protocol.

Figure 1B:
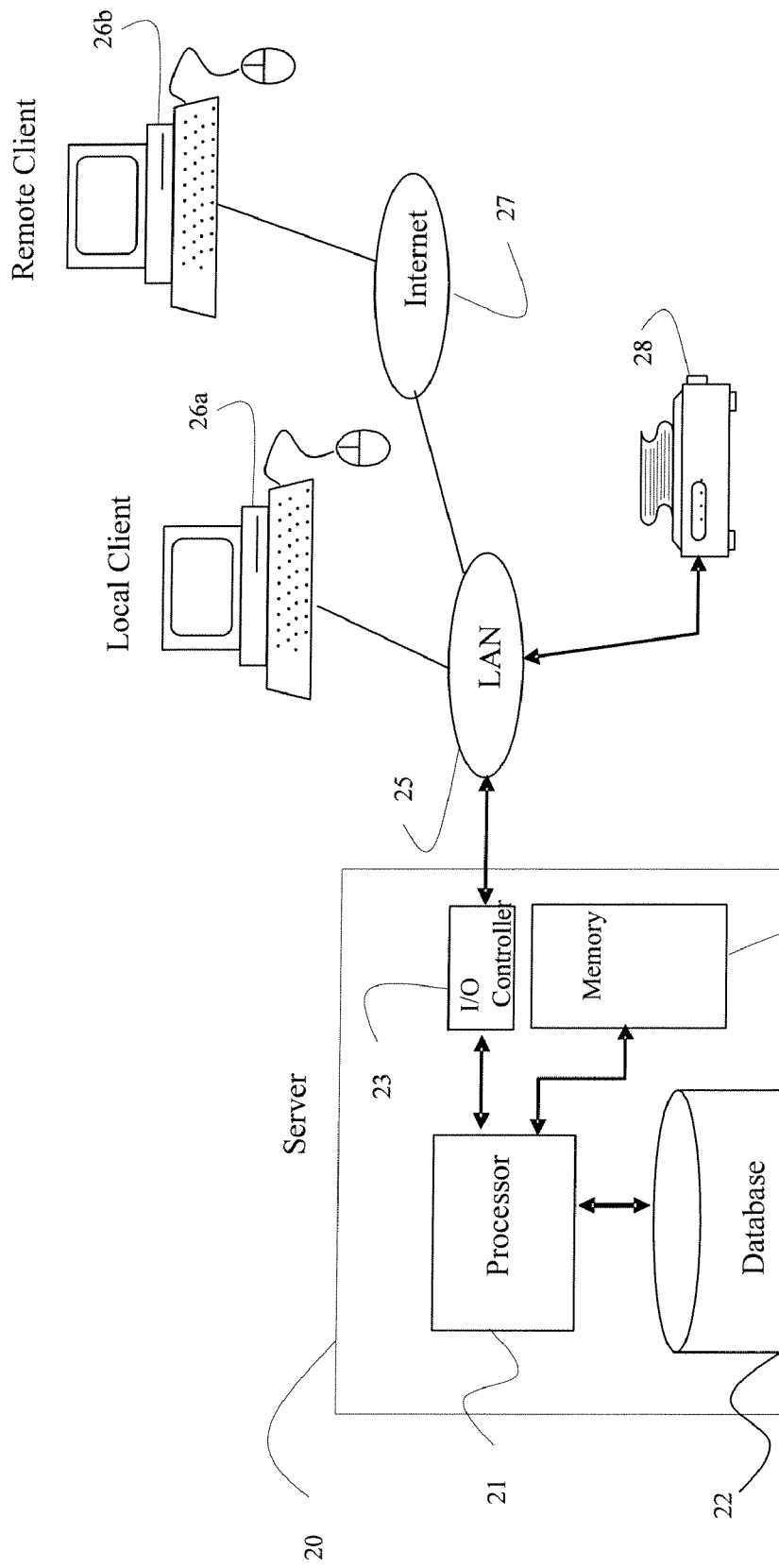
FIG. 1B is an embodiment of a processing system having a distributed communication and processing architecture that may be used to practice aspects of the present invention.

An alternative embodiment of a processing system that may be used is shown in FIG. 1B. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to a wide area network 27, such as the Internet. A remote client computer 26b may execute a web browser, so that the remote client 26b may interact with the server as required by transmitted data through the wide area network 27, over the LAN 25, and to the server 20.

Those skilled in the art of data networking will realize that many other alternatives and architectures are possible and can be used to practice the preferred embodiments. The embodiments illustrated in FIGS. 1A and 1B can be modified in different ways and be within the scope of the present invention as claimed.

The embodiments according to the present invention provide age verification/content filtering (AV/CF) through a network-based configuration that is comprised of a configurable consumer profile/policy saved to a database; a content rating engine and database; a policy enforcer/verification engine; and, a user reporting system. The systems and methods according to the present invention allow account owners to opt-in to limit a user's access to various types of content based on the content's rating. Ratings may be predefined for static content or determined dynamically in the case of Internet (web) and wireless access protocol (WAP) content. A user's policy profile may be defined by the user's date of birth or set ratings for the different media. Exemplary content ratings may include, for example, universal, youth, teen, mature, adult and banned. Banned content is blocked for all users regardless of age. All other content rating can be picked for each different form of media (e.g., music, video, games, advertising, etc.). Account holders are also able to track a user's usage and the different types of content the user has accessed or attempted to access. A log of subscriber data content activities is kept.

Account holders have an option in one embodiment that allows them to protect their own handset through, for example, a personal identification number (PIN), or other forms of authentication such as, for example, voice recognition, biometrics, etc. If the account holder has restricted access to their handset, this would prevent minors or others from obtaining possession of the account holder's wireless terminal and accessing adult or other inappropriate content. The account holder is provided with secure account privileged access through a carrier's web and WAP sites to build and maintain profiles for each wireless terminal or handset associated with the account holder.

The AV/CF system may be configured in several ways, including: as a proxy where opted-in users are directed by the proxy to retrieve their content. In the proxy format the proxy makes policy decisions before returning any content to a user; or as an in-line filter to each product, where all content is checked as the data passes through. The in-line filter can be additional hardware placed adjacent to the serving product platform or somewhere along the path of transport for the service. The network lay-out may be managed in a centralized manner, a distributed manner or a combination thereof in various embodiments of the present invention. In a centralized manner, profiles, content rating engine and policy enforcement would be managed in single location. In a distributed architecture, the profiles may be centralized and content rating can be limited to the number of gateways to the carrier's data network and, depending on the content, and the policy enforcement can be done at the various points along the service path.

The preferred embodiments according to the present invention provide an infrastructure capable of managing subscriber access to age restricted content in a secure and confidential manner and methods for doing so. The age verification platform manages access to restricted content for postpaid and prepaid carrier subscribers for mass-market devices (handsets or wireless terminals). The age verification platform provides a carrier with functional capabilities to control content access, including: subscriber age verification/user authentication; content rating; content filtering; parental controls; and, user reports.

Generally, content is classified into five main categories in a preferred embodiment according to the present invention, though it is to be appreciated that more or fewer categories are within the scope of this invention. Categories may include, for example: universal content (accessible by all users, including minors); youth content; teen content; age restricted content (e.g., mature and adult), and blacklisted content (illegal or otherwise restricted for all users). The content categories of the present invention may map to industry-standard rating systems such as, for example, ESRB (Entertainment Software Ratings Board), ICRA (Internet Content Ratings Association), MPAA (Motion Picture Association of America), NCTA (National Cable and Telecommunications Association), RIAA (Recording Industry Association of America) Parental Advisory Program, TV Guidelines Monitoring Board, CTIA ratings, and other existing or future-developed rating systems. It is to be appreciated, however, that content standards according to the present invention may differ from those of any or all of the above.

In order to implement age verification, subscribers must provide proof of identity and age in order to create a profile. Account holders may opt to protect content access with a self-created and managed PIN or other forms of authentication.

The components of the AV/CF system include an age-verification platform. The age verification platform provides a secure and regulated mechanism for controlling access to age restricted information presented through a mobile web (Internet) service, and other consumer data services such as, for example, wireless video and music (e.g., VCAST TM as offered by Verizon Wireless, Inc.), music, ring-back tones (RBT), multimedia message service (MMS), off-net content, binary runtime environment for wireless (BREW), and other future endeavors without creating any significant impact to the user's experience (i.e., added steps or latency added to the processing of the transaction).

Figure 2:
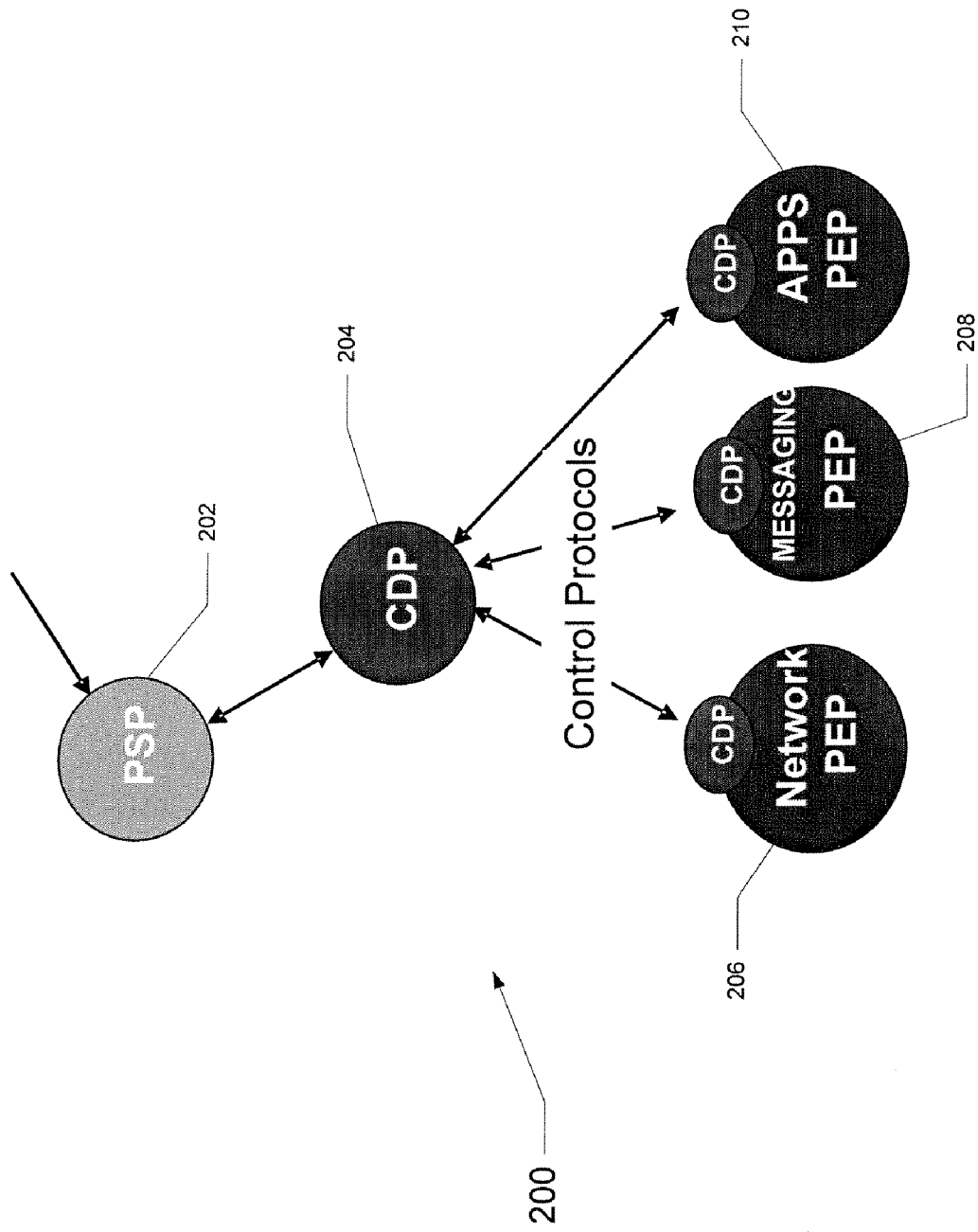
FIG. 2 is a block diagram of the components of an age verification platform according to one embodiment of the present invention.

FIG. 2 is a block diagram of the components of an age verification platform according to one embodiment of the present invention. The platform 200 of this embodiment is comprised of a policy service profile (PSP) 202, and a content decision point (CDP) 204. The platform is further comprised of one or more policy enforcement points (PEPs) that utilize the CDP 204. There is a PEP for each form of content that is available through a handset or wireless terminal, where each form of content is herein referred to as a "product silo." In the embodiment of FIG. 2, there is a network PEP 206 where decisions about Internet content are enforced; a messaging PEP 208, where decisions about, for example, SMS and MMS content are enforced; and an applications ("apps") PEP 210, where decisions about the content of applications such as, for example, games, are enforced. The PEPs work in concert with the CDP 204 to determine the content rating of requested content and then, based upon a user's profile as contained within the PSP 202, either allow access to the requested content or deny access. Requested content, whether accessed or denied, is also recorded by the CDP 204 for reporting purposes. It is to be appreciated that the scope of this invention includes more or fewer product silos, including content from products that may be developed or employed in the future.

The PSP 202 is a database that contains one or more configurable user profiles. Its purpose is to maintain users' profiles and to identify the age of a user. The PSP 202 provides feedback to the content filtering system (PEPs) 206, 208, 210. The PSP 202 is configured to provide account holders the ability to create content profiles for a user that is the account holder as well as any other users that are associated with the account holder. The content profiles may be restricted based on users' age or the account holder or user's preferences.

The CDP 204 is comprised of a content rating engine and a database. The CDP 204 may rate content using the industry-standard rating systems (MPAA, RIAA, ESRB, etc.), described above, where such ratings are mapped to the content categories used in an embodiment of this invention (e.g., universal, youth, teen, etc.), or content may be "rated on the fly" by the content rating engine by searching for domain names and extensions, words or phrases, metadata, pattern mapping and other means of content rating as are known in the art. The PSP 202 and the PEP 206, 208, 210 each interface with the CDP 204 in order to filter content provided to users. The CDP 204 may utilize software running on a server or other computing device and control protocols from, for example, SurfControl, Inc. of Scotts Valley, Calif.; RuleSpace, LLC of Portland, Oreg.; and PureSight of Peta Tikva, Israel, among others.

Each PEP 206, 208, 210 is comprised of a policy enforcement/verification engine. Content that is available to users such as, for example, wireless video and music, RBTs, SMS, MMS, BREW, etc. is either rated or the rating is obtained using the CDP 204 and the rating is then compared to the requesting user's profile in the PSP 202 to determine if the content will be provided to the requesting user. As shown in FIG. 2, the PEP 206, 208, 210 may employ a distributed architecture where enforcement occurs at the point where content enters the carrier's network (e.g., the product silos). However, it is to be appreciated that the PEP may also employ a centralized architecture or a combination of distributed and centralized functionality.

Figure 3:
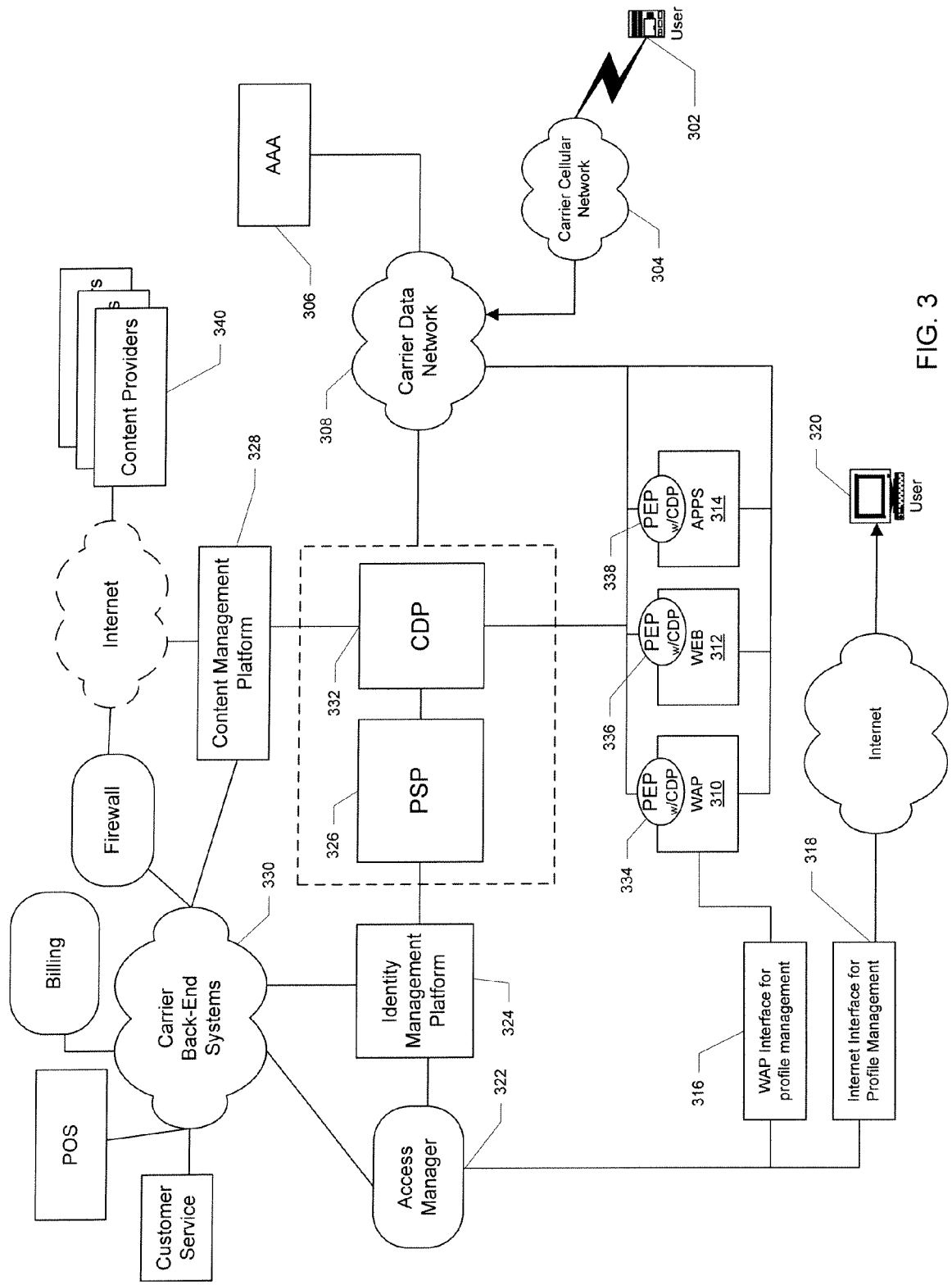
FIG. 3 is an embodiment of an AV/CF platform incorporated into a wireless telecommunication carrier's network.

FIG. 3 is an embodiment of an AV/CF platform incorporated into a wireless telecommunication carrier's network. In FIG. 3, a user using a handset or wireless terminal 302 makes a request to a carrier's cellular network 304. The user is authenticated as a subscriber to the carrier by an authentication, authorization, and accounting (AAA) server 306, as are known in the art. If authenticated by the AAA 306, the user's request is received by the carrier's data network 308. The user's request is routed by the data network 308 to one or more product silos including WAP 310, web 312, and apps 314. Depending upon the nature of the request, the request is routed to the proper silo 310, 312, 314 by the data network

308. Also included in the carrier's network is a WAP interface 316 for managing the user's profile in the AV/CF platform and other user-related functions (e.g., billing, usage, etc.) using their handset 302. Furthermore, an Internet interface 318 is provided such that a user may manage their profile(s) and carrier account through a "wired" Internet connection device 320.

Based upon a user's authorization (e.g., must have account holder status) as determined by an access manager 322, the user is provided access to an identity management platform 324 that allows the user (i.e., account holder) to manage profiles associated with the account holder. The identity management platform 324 allows user profiles to be established and at least a portion of the information is stored on a policy service profile (PSP) 326. Through the identity management platform 324 an account holder may establish profiles for him/her-self and any other user associated with the account. The profile includes at least the user's telephone number, their age and a content rating for various products. For instance, a user may be restricted to youth for video (i.e., video on demand), yet be allowed to access games and send SMS messages that fall into the "teen" category. Likewise, for each category of available content, a content rating may be associated in the user's profile. If no content is specified and the user is under age 18, then the content defaults to "universal." Though shown as a separate element in FIG. 3, it is to be appreciated that the PSP 326 may be combined with one or more elements of the AV/CF platform and the telecommunication carrier's network. For instance, in one embodiment the identity management platform 324 and the PSP 326 may be integrated with the AAA server 306. Likewise, other elements shown separately in FIG. 3 may be integrated into or with other components and elements.

Similarly, the system of FIG. 3 includes a content management platform 328. The content management platform allows the carrier to establish content categories and map commercially available rating systems (MPAA, ESRB, etc.) to the carrier's defined content categories. These ratings may be provided by the various content providers 340. It also provides software and systems for rating unrated content "on the fly" using known means, such as word and phrase searching, metadata searching, image mapping, etc. The content management platform is controlled through a carrier's back-end system 330, which includes supervisory, billing, point of sale and customer service components. The content management platform 328 works in cooperation with the identity management platform 324 to enforce content rating restrictions as defined in the PSP 326 based upon a user's age or the content restriction applied to the content categories by the account holder for a user. Enforcement of content rating restrictions occurs through a content decision point (CDP) 332. The CDP 332 determines the rating of content that a user is attempting to access, determines the content category that the content is mapped to, compares the content category to the user's profile and either provides or denies access according to the user's profile. Each product silo 310, 312, 314 is provided with a policy enforcement point (PEP) 334, 336, 338 that, in cooperation with the CDP 332, grants or denies access to content through the respective product silo 310, 312, 314 depending upon the user's profile in the PSP 326.

Figure 4:
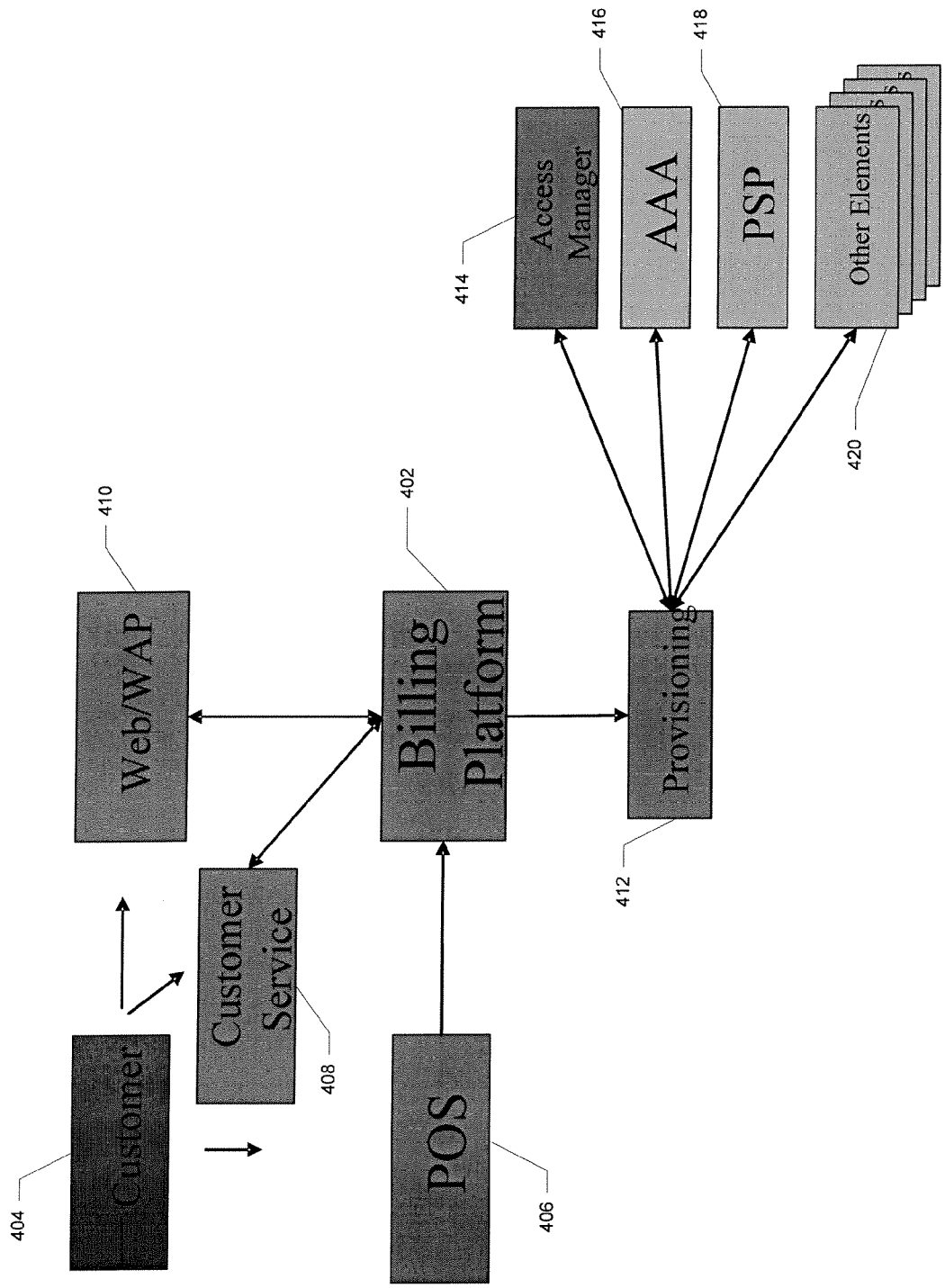
FIG. 4 shows an embodiment of a billing platform's interface with components of the AV/CF system.

In various embodiments, the age verification platform supports an interface to a billing system that may be used to bill for the AV/CF service or for the AV/CF to obtain data from the billing system. For example, FIG. 4 shows an embodiment of a billing platform's 402 interface with components of the AV/CF system. In FIG. 4 a customer 404 that is an account holder is able to add, modify, delete or otherwise change data related to their AV/CF service through carrier interfaces including point of sale (POS) 406, customer service 408 and web/WAP access 410 to the carrier through the account holder's handset. Through a provisioning system 412, some or all of the information from the billing platform 402 is distributed to various components of the carrier's network including the AV/CF systems. These components include the carrier network's access manager 414, AAA 416, PSP 418, and various other elements 420. Information distributed may include the mobile directory number (MDN), which is a 10-digit directory number used to call a wireless phone, of the account holder and users associated with the account holder, the account holder's PIN, birth dates of the account holder and associated users, content rating restrictions that are to be applied to the account holder and users associated with the account holder, etc.

The AV/CF infrastructure supports multiple state and local legal requirements concerning parental controls and content filtering and can be adapted to conform to future laws and regulations as they arise. As state regulations concerning this issue are created, the AV/CF features may be adapted and implemented. The AV platform is compatible with location based systems (LBS) as are used by carriers and are known in the art in order to identify the location or state of the user. It is also to be appreciated that the AV/CF system does not require handset modifications in order to support the service. Authentication, filtering, and access control is managed through the age verification server platform of the carrier's network.

The AV/CF may have a default state such as, for example, if the platform were to go into a failed state it should at a minimum deny access to restricted/banned content.

As described above, the PSP 202 contains user profiles. According to an embodiment of the present invention, authentication of the account holder and their age is required to allow the account holder to set up any profile. This authentication may be in the form of, for example, a state issued drivers license, a birth certificate, or other government issued forms of identification that provide an age or birth date. A user may be an account holder. An account holder is a person that is responsible for one or more handsets or wireless terminals. For instance, a parent may be the account holder and the parent's teenage children are users that are associated with the account holder. The account holder is ultimately responsible for the payment of wireless communications billing for the account holder and any associated users.

Age verification administration is tied to the account holder, rather than the person using the phone. Age verification will be tied to the birth date designated to a user MDN, by the account holder. An account holder may create a PIN in order to access content classified as mature and/or adult or otherwise restricted. The PIN is stored in the user's profile on the PSP. The account holder may customize access code capabilities for each PIN—e.g., one PIN code will allow access to mature content, while another PIN from the same account holder will authorize access to age restricted content. Generally, users under the age of 18 are not allowed to create PINs. An account holder is directed to sign up for a PIN through a carrier's web site, or self-provision a PIN using their wireless handset.

When a user attempts to access restricted content in a WAP data session or when they attempt to access a BREW deck, the user will be prompted to enter his/her PIN, if a PIN is required. A key is created of the MDN and the PIN and the MDN-PIN key is verified against PSP 202 database. Access to the requested content is granted or denied based upon the returned result. If denied, then the user receives a message on his/her handset regarding the reason for access denial, i.e. "Profile restriction", "age restricted content", or "user profile has not been created."

Furthermore, an account holder is able to create a PIN for each of the other devices on their account. However, distribution of PINs to other users is entirely the responsibility of the account holder. The account holder may modify their access code or profile at any time. If the account holder removes the AV/CF feature, then content access defaults to "all" authorization. If the account holder activates the AV/CF feature, then content access defaults to "under-18" authorization for all devices associated with the account holder. The account holder may assign content rating to any one of the content categories under the AV/CF platform.

Age verification profile management is accessible through the account holder's profile management application available through an application such as "My Account" from Verizon Wireless via the carrier's web site (web version) or through the handset (WAP version). Users who attempt to access restricted content that is PIN protected will be prompted to enter an access code for authentication once per data session regardless of previously accessed content. Users are not able to configure their profile to automatically enter and store their PIN for any device—it is required to be manually entered.

Content Rating

In one embodiment of the present invention, content from the various genre such as mobile web sites, WAP sites, video, music, MMS, and other services will be classified into one of five categories: universal, youth, teen, age restricted, and banned. As previously described, the CDP engine recognizes and supports multiple distinct rating types and methodologies (e.g., ESRB for games, MPAA for videos, etc.) and maps such industry ratings to the content rating of the present invention. It is to be appreciated that such mapping may allow various types of relationships between the industry rating systems and the content rating of the present invention such as one to one, one to many, and many to many.

Furthermore, new content rating classifications and methodology may be changed. However, modifications to a content rating methodology for a particular service do not affect other rating systems (e.g., adding a new rating scheme for "mature" BREW applications does not affect rating, filtering, or processing of video or music content). The embodiments of the present invention provide a means to define new content rating categories in real time, and/or subdivide existing categories into subgroups. Furthermore, the content rating engine of the CDP is able to intelligently classify unrated content. The content rating engine flags content not classified or content that cannot be classified dynamically for manual classification. A small turnaround time (generally under an hour) is required for manual classification. The content rating engine will be able to reclassify content already published on the Internet in accordance with changes in the rating schema of the present invention. The content rating engine supports the rating of content that is on the Internet and off the Internet and will support searching and content returned as the result of a search.

The classification of content generally occurs in one of two ways: self-classification, by using guidelines for rating categories according to the present invention, content is rated through the use of metadata configured by the content provider. A second way of rating content is by the content rating infrastructure deployed in support of age verification classifying content based upon information contained within the content (URL, source provider, words, phrases, pattern mapping, etc.). An exemplary rating system for content rating according to the present invention may be categorized as shown in Table I.

TABLE I

| CONTENT CATEGORIES | ACCESSIBLE CONTENT |
|---|---|
| Universal | EC (early childhood), E (everyone)-rated games |
|  | G (General Audiences), TV-Y7, TV-Y, TV-Y7 (FV), and TV-G - video content |
| Teen | E10+ (everyone 10+) and T (teen) - rated games |
|  | PG (Parental Guidance Suggested) TV-PG, TV-14, PG-13 movies - video content |
|  | Parental Advisory (Explicit Content) and Edited Version - audio content |
| Mature | TV-MA television content |
|  | M (mature) rated games |
|  | R-rated movies |
| Adult | Pornography, NC-17 and/or X rated video content |
|  | Adults Only and RP - games content |
| Chat Control | Moderated |
|  | Un-moderated |
|  | Adult |
| SMS and MMS | Rated Dynamically |
| Blogs, Journals and Blog Sites | Rated Dynamically |
| Banned | Access Denied (Illegal content, child abuse/child pornography, criminal obscenity, criminal hate speech) |

In one embodiment, account holders are provided with a website and/or a WAP site in order to report content that was improperly classified. This content (URL, video, etc.) will be investigated by the carrier and/or the content rating engine vendor (as appropriate) and reclassified if necessary.

Content Filtering & Restricted Access

Content is measured against a rating scheme such as that described in Table I. Content is filtered based upon the account holder's service plan, PIN verification, and user profile definition. One such category of content is "banned" content, which is composed of material that is inaccessible via a handset. This list of banned content contains URLs populated by the content rating engine, the carrier, and legal authorities as appropriate. In one embodiment, user access requests for blacklisted content is logged and made available to appropriate law enforcement agencies through due process of law. Universal defined content is generally treated as "all" access and bypasses the age verification process. Content filtering requirements will differ based upon the device used to request the content (air cards v. handsets v. smart phones/PDAs/, etc.) because of the different media accessible by different devices.

Content filtering does not occur on content that has been downloaded and stored onto a user's device. Once content has been downloaded to the user's handset, the user will access/play the content without additional access code entry requirements. Furthermore, peer-to-peer delivered content is not be filtered (e.g., MMS or SMS), however, incoming MMS and SMS messages, non peer-to-peer, may be screened for objectionable content through the content filtering engine based upon a pattern-matching algorithm and/or words (including "slang") and phrases. If an image is recognized as adult/mature, the user will be notified and given the option to either ignore the message or receive it. Outgoing MMS messages are not screened, as the files are user-generated.

Access or delivery of campaign managed SMS and MMS services may be filtered based on classification of short/long code by a campaign manager and a user's profile. For instance, a campaign for an adult magazine may be restricted such that it is not made available to users under the age of 18, while a campaign for a children's television program may be provided to all users regardless of age. A PIN may be requested for access or delivery of age restricted short/long coded services. The PIN authorization is valid for a set amount of time (user configurable), based on inactivity, such that it will allow the average session of successive messages without repetitive authentication PIN requests.

Different methods may be employed to allow or restrict access to different forms of media content. Access to entertainment media such as video, music and games is generally rated by the content provider and delivered to a carrier with a rating label. When a user attempts to access an entertainment media that is age restricted they will be prompted for their PIN. Once approved, the user may access any of the media during that data session without being requested for a PIN. The embodiments of the present invention allow flexibility in when to ask for the entry of a PIN.

Access to BREW applications is restricted to different catalog views based on a user's profile. The user PIN is requested by the AV/CF system when attempting to access a BREW platform to determine the catalog view presented. The applications are rated before being published to the group manager. A user may only access a catalog that has a content rating appropriate for that user. For instance, if a user has a "teen" content rating set in their profile for applications, then the user will be able to access only the "teen" and "universal" catalogs.

When a user requests to access a web or WAP page, the gateway retrieves the requested URL, while in parallel looking up the content source. If the content is rated as "universal," the user is allowed to access the page. If the content is rated as "mature/adult," the user will be prompted for an access code (i.e., PIN). If the user's access code is validated, the content will be provided to the user. If the user's access code is denied, the user may re-enter the PIN; otherwise, the page will not be displayed to the user and the user will be redirected. In the event the user's profile does not exist in the PSP 202, the user will be redirected to a page where they will have the option to create a profile if they can provide authentication that they are the account holder. Once a user has proven their profile rights to access age restricted content they will not be requested to verify themselves during the rest of the data session. The data session is maintained using the current rules for the session linger timer (i.e., WAP releases 1.0/2.0). If PIN authentication fails, the user will be redirected to a screen that indicates the reason for denied access. If the reason for authentication failure is because the profile does not exist, then they will be offered a link to register. Upon search returns the filter will remove restricted content.

Parental/Administrator Control

Each account holder is able to create and manage access codes for other users on his/her account. Profiles are stored in the PSP 202 database that may be located locally in the carrier's network or externally as provided by a vendor. Profiles are managed from the handset or the web and are generally presented in a consistent access management format for ease of use and familiarity. In the event of several MDN in an account, the account holder designates a "master MDN" that becomes the administrator's identifier. If the account holder chooses to PIN-protect one or more MDN, then the AV/CF system may generate a random PIN, or the account-holder may designate a PIN.

Account holders are able to specify what genre and what content are permissible for each user associated with the account holder in the users' profiles. By default the users will be subjected to a classification based on an associated age guideline. For example, no user under 18 years old can have their content rating set to "adult." Their default rating will be "universal." The account holder will be able to specify specific http addresses (URLs) to deny for particular users. In one embodiment, the account holder may specify that a user is able to access certain content during a time window of each day. For instance, "teen" game content may be specified as being accessible by a user between 4:00 p.m. and 7:00 p.m., Monday through Friday, but available at any time on the weekend.

A user's profile settings in the PSP 202 are used to determine menus and portal content provided to a user according to the user's MDN. Account holders are able to access reports detailing usage information on restricted content requests per access code on the account. These reports are available over the web or through the account holder's handset. The account holder may sign up for SMS, email or other forms of notification when a user on the account attempts to access restricted content, a secondary MDN has reached a spending limit, or for other account holder defined early warning notifications. Such messages may be charged at the carrier's standard text messaging rates (if any). Furthermore, a user may communicate to the user's account holder via SMS, email, etc. to request access to specific Web/WAP content that has been denied. The account holder may view the content requested and may override restrictions to allow the user to continue with their access session. It is also contemplated within the scope of an embodiment of the present invention that the account holder may monitor and approve SMS traffic for their user associated with the account holder. This may be performed from the account holder's handset or the account holder may obtain message logs on-line via the carrier's website. It is further contemplated that the account holder may create a "white list" of allowed numbers for SMS and MMS messages (send and receive). Such a white list may be populated from the account holder's phone book or default to sub account numbers. The account holder may also give administrative rights to a single user within the account (including the account holder). Administrative rights will allow administrator to create user profiles, set filters, set restrictions and view reports. User level definitions will be allowed.

In one embodiment, SMS and MMS messages are not individually monitored. For instance, if another user is on a user's white list, then the user may be allowed to exchange messages with the other user for a defined period of time, as such time limit is placed on the user's account by the account holder. Messaging may also be limited by the service plan that a user or account holder has subscribed to, as messaging may be terminated once a user has reached their allotted number of messages for a time period (e.g. a month).

Reporting

Generally, user requests for access to blacklisted or banned content are logged, and in some instances may be made available to appropriate law enforcement agencies. Furthermore, user requests for any category and any level of restriction are logged. Account holders may access web reports detailing usage information on all content requests per user on the account. The account holder will be able to access web reports detailing usage information on restricted requests per user (i.e., MDN) on the account, i.e. the reporting tool must be able to filter user specific requests for specific categories and types of restriction. A certain time period (e.g., 3 months) worth of data is archived by the AV/CF system for an account holder's use. It is contemplated that an account holder/administrator may retrieve statistics and reports for all associated users in one account report. Alternatively, the account holder has access to reporting information on a per-user basis for each access code created for the account. This information is available through a secure carrier web site or through the account holder's handset (based on PIN access). Other users associated with the same account holder are not able to access information for other users or the account holder. Logging and other report data will only be accessible by the account holder.

Transport

The AV/CF system and methods occur independently of the transport mechanism (1xRTT or EV-DO) utilized by the subscriber to request content. No transport-specific restrictions are built into the age verification infrastructure.

Digital Rights Management (DRM)

Classification of content occurs independently of any DRM protection (i.e., encryption) surrounding the content in the AV/CF system. For on-network content programmed by the carrier, metadata describing the rating is provided by the content provider and verified by the content rating engine as appropriate. Off-network content protected by DRM is rated by the content rating engine, and allowed or blocked through the age verification procedures described elsewhere herein.

Filtered Content Types

Content filtering is applied against at least the following content types: Enhanced messaging service (EMS), which is an enhanced version of Short Messaging Service (SMS) comprised of several text messages that are clustered together. EMS provides capabilities for more rich messaging features such as sending/receiving ring tones and other melodies/sounds, pictures and animations, and modified (formatted) text; Downloadable ringtones, games, emails, directions, instant messages services such as "Get It Now" as offered by Verizon Wireless, Inc.; MMS; music videos; ring-back tones; video, web content and WAP content.

Provisioning

As shown in FIG. 4, users are able to provision age verification service through their carrier using at least the following avenues: point of sale, the carrier's website and self-provisioning from the handset (for the account holder). Parental control web reports are available via the carrier's web site and via their handset (PIN-protected). Account holders are able to sign up for age verification and parental control service through the above interfaces. In addition, account holders may create and manage access codes through any of the above interfaces. Likewise, a carrier may allow cancellation/de-provisioning to be supported through these interfaces, or may require contacting the carrier's customer service group. When an account holder's carrier service is terminated, all age verification profiles associated with that account holder are deleted.

Exemplary Methods of Use

Figure 5A:
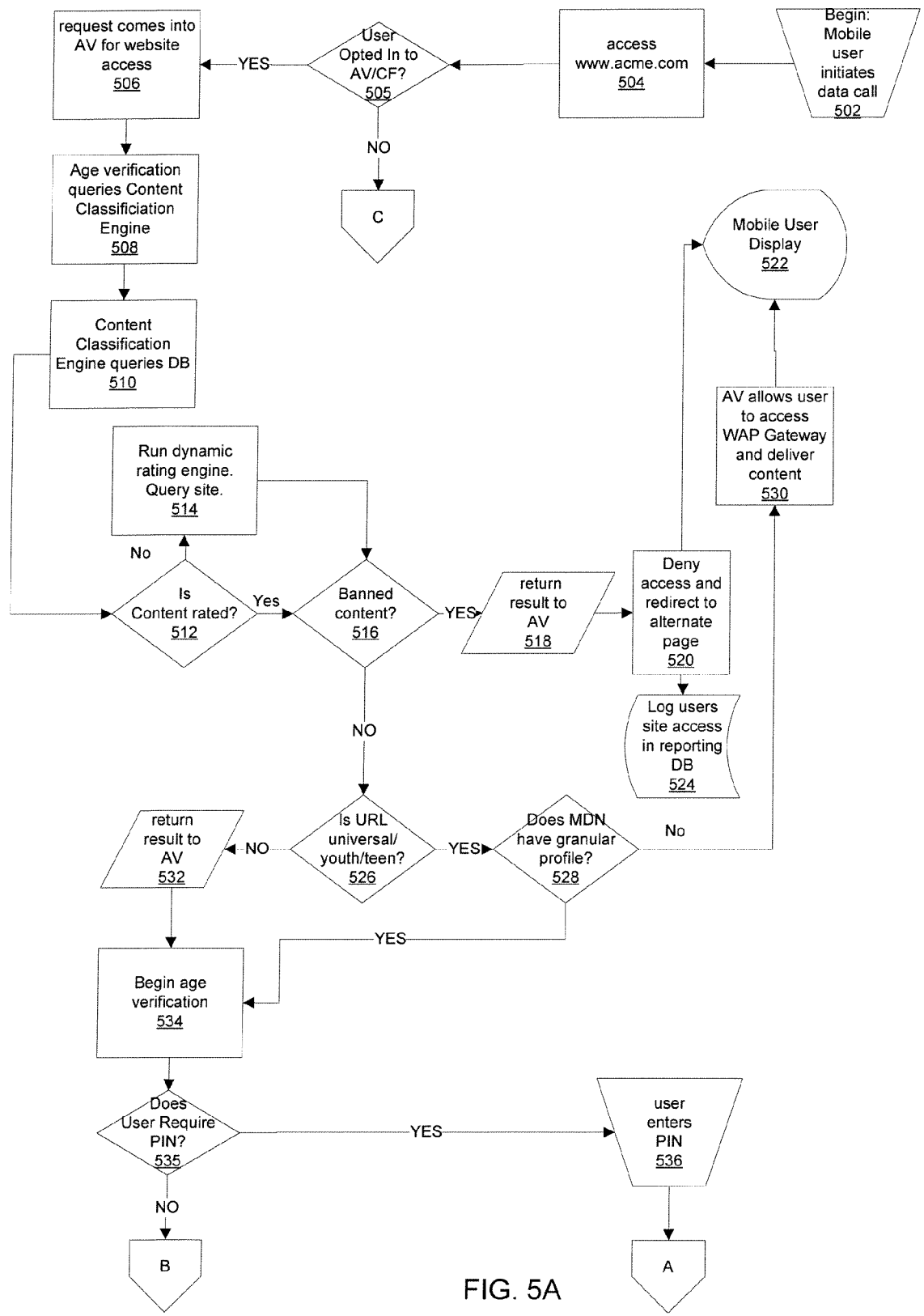
FIGS. 5A and 5B illustrate a flowchart for an exemplary process of providing an AV/CF system on a wireless telecommunications system.
Figure 5B:
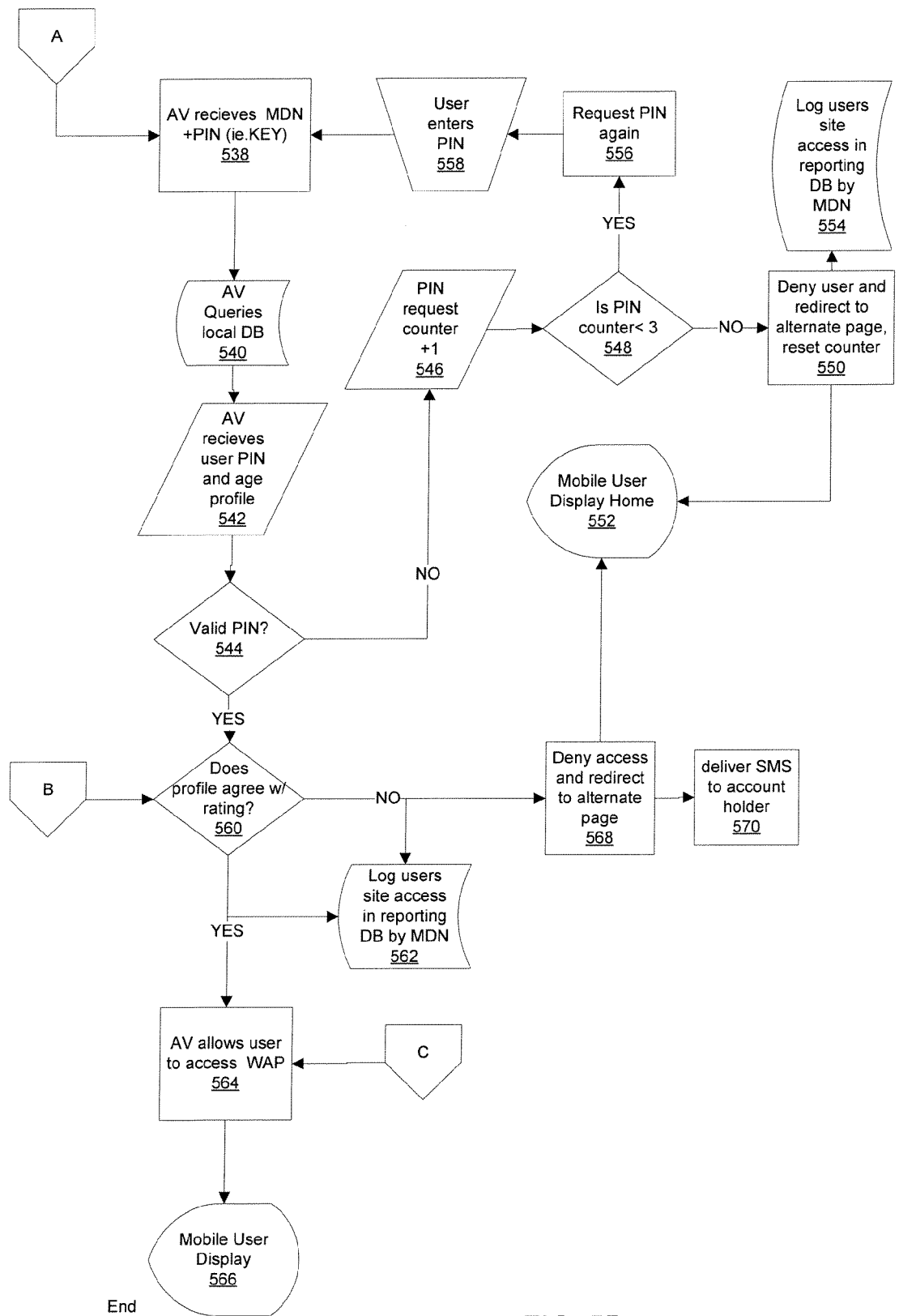

Overall Use of System:

FIGS. 5A and 5B illustrate a flowchart for an exemplary process of providing an AV/CF system on a wireless telecommunications system. At step 502, the process begins with a mobile user initiating a data call. At step 504, the user accesses a URL such as the exemplary URL, www.acme.com. At step 505, it is determined whether the user has opted in to age verification and content filtering. If not, then the process goes to step 564, where the user is provided access to the requested site (e.g., www.acme.com). If the user has opted in to AV/CF, then the process goes to step 506. At step 506, a request is received by the age verification (AV) platform for access to the website, www.acme.com. At step 508, the AV platform queries the content classification engine and, in turn, at step 510 the content classification engine queries a content database that contains rating information about specific content. At step 512, it is determined whether the content that the user is attempting to access is rated. If it is not rated, then at step 514 the content is dynamically rated by a dynamic rating engine. If it is rated, then at step 516 it is determined whether the content is banned content. If the content is banned, then the process goes to step 518 where an indication that the content is banned is returned to the AV platform and at step 520 the user is denied access and redirected to an alternate web page that is displayed on the mobile user's display (step 522). At step 524 the AV platform logs the user's attempted access of a banned site.

If, at step 516, the user has not attempted to access banned content, then the process goes to step 526 where it is determined whether the user has attempted to access content that is rated universal, youth or teen. If, at step 526 the content does have a rating of universal, youth or teen, then the process goes to step 528 where it is determined whether the user (as determined by their MDN) has a granular profile. This means whether the user has assigned content categories for different types of content. For example, the user may be assigned a rating of "youth" for video, but "teen" for games. If, at step 528, the user does not have a granular profile, then according to the default rules of this embodiment, the process goes to step 530 where the AV platform allows the user to access the WAP gateway of the carrier's system and the content is delivered to the user where it is displayed (step 522).

If, at step 526, the content is not rated universal, youth or teen, then the process goes to step 532 where an indication of the rating of the content that the user is attempting to access is returned to the AV platform, or if, at step 528, the user does have a granular profile, then the process then goes to step 534 where an age verification process begins. At step 535 it is determined whether the user is required to enter a PIN to access the requested content. If the user does not require a PIN, then the process goes to step 560. If, at step 535, it is determined that the user does require a PIN, then the process goes to step 536. At step 536 the user keys in (or speaks if their handset or the AV platform is equipped with voice recognition technology) the user's personal identification number (PIN). At step 538, the AV platform receives the user's PIN in combination with the MDN of the handset the user is using to access the AV platform. The AV then uses the MDN to query a database that contains user profile information associated with the MDN at step 540. At step 542, the AV receives the information associated with the MDN including the PIN and the user's profile. At step 544 it is determined whether the PIN entered by the user is the same as the PIN in the user's profile (i.e., is the entered PIN valid?). If, at step 544, it is determined that the PIN entered by the user is not the same as the PIN in the user's profile, then the process goes to step 546 where a PIN request counter is incremented. At step 548 it is determined whether the PIN request counter is less than a certain number (in this exemplary embodiment, the certain number is 3, though it is to be appreciated that the number may be greater or less than three). If the PIN request counter is not less than the certain number (e.g., 3), then the process goes to step 550 where the user is denied access to the requested content, directed to an alternate web page, and the PIN request counter is reset. At step 552 the alternate page is displayed to the user and at step 554, the AV platform logs the user's attempted access of the content.

Returning to step 548, if the PIN request counter is less than the certain number (e.g., 3), then the process goes to step 556, where the AV platform requests the user to enter the PIN again. The user, in turn, re-enters their PIN at step 558 and the process goes to step 538.

Returning to step 544, if the PIN entered by the user is the same as the PIN in the user's profile (i.e., the PIN is valid), then the process goes to step 560 where the rating of the content that the user is trying to access is compared to the rating allowed for such content as such allowed rating is found in the user's profile. If the user's profile indicates that the user is allowed to access content of the nature that the user is attempting to access, then the process reports the access at step 562 and the process goes to step 564 where the user is provided access to the content, which is displayed to the user on the user's handset at step 566. If, at step 560, the user's profile indicates that the user is not allowed to access content having the rating of the content that the user is attempting to access, then the process records the user's attempted access at step 562 and the process goes to step 568, where the user is denied access to the requested content, redirected to an alternate website that is displayed to the user (step 552). Furthermore, at step 570, the account holder is provided with notification of the user's attempted access of restricted content.

Method of Provisioning AV/CF:

An account holder may sign up for the age verification/content filtering service through a carrier's point of sale provisioning, through the carrier's website, or through handset self-provisioning. Likewise, the account holder may self-provision an age verification access code through the handset, sign up for an access code at point of sale, or sign up for an access code through the carrier's website. Furthermore, the account holder may create access code(s) for other users on his/her account.

Figure 6:
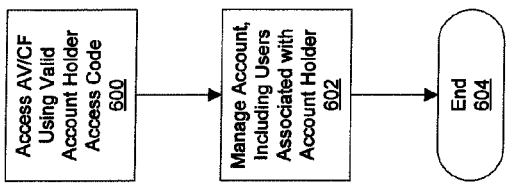
FIG. 6 is a flowchart for an exemplary process of managing an account by an account holder.

FIG. 6 is a flowchart for an exemplary process of managing an account by an account holder. At step 600, the account holder accesses the AV/CF platform. This may be performed via a computing device through the Internet, or by use of the account holder's handset. At step 602 the account holder managers his or her account. The account holder may manage their account by removing/deleting/revoking/changing access levels of access codes tied to his/her account at the carrier's point of sale, through the carrier's website, or from the account holder's handset. Likewise, in the management of an account, the account holder may sign up for a messaging (e.g., SMS/MMS) alerts for content notification per access code, and the account holder may delete the messaging alert notification for an access code. The process ends at step 604.

Universal Content Access:

A subscriber may access universal content (with no code entry required) according to their subscription plan with the carrier.

Figure 7:
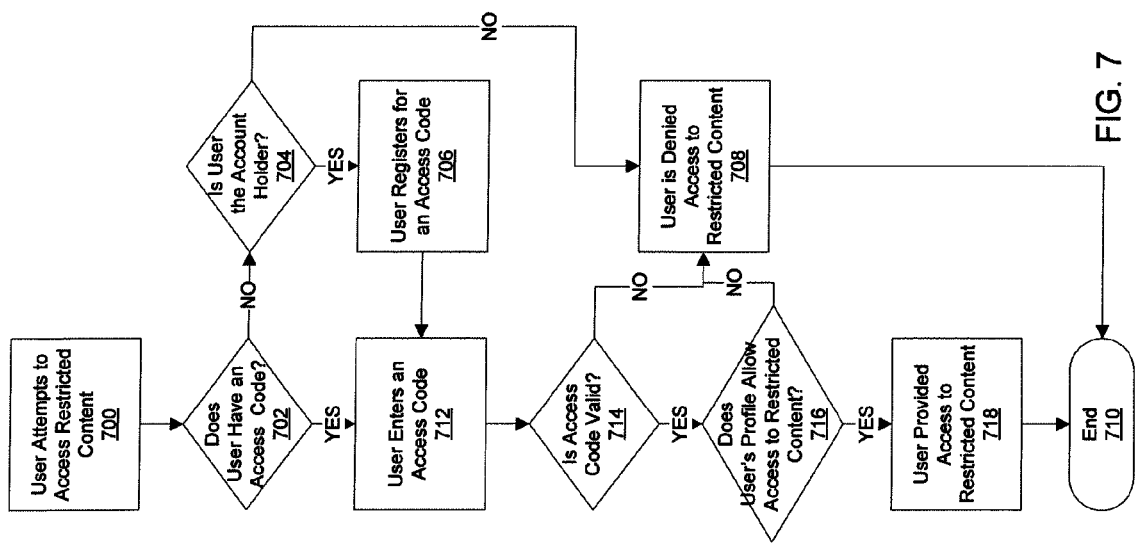
FIG. 7 is a flowchart for an exemplary process of accessing restricted content using an embodiment of the present invention.

Access to Restricted Content:

FIG. 7 is a flowchart for an exemplary process of accessing restricted content using an embodiment of the present invention. Restricted content may be in the form of videos, music/audio, RBTs, games, applications (e.g. BREW), messaging (SMS/MMS), chat sites, etc. The process starts at step 700 where a user attempts to access restricted content via a handset. At step 702, it is determined whether the user has an access code. This may be determined, for example, by a look-up in a table or database based on the MDN of the handset, or by requesting the user to enter an access code. If the user does not have an access code, then the process goes to step 704 where it is determined whether the user is an account holder. This may be determined, for example, based on the user's MDN. If the user is an account holder, then at step 706 the user registers for an account code and is either provided one or creates one for the AV/CF system. If, at step 704, the user is not an account holder, then the user is denied access to the restricted content (step 708) and the process ends at step 710.

Returning to step 702, if the user has an access code or if the user is an account holder and now has an access code (step 706), the process goes to step 712 where the user enters their access code. At step 714 it is determined whether the access code is valid. If the access code is not valid, then the user is denied access to the restricted content (step 708) and the process ends at step 710. If the access code is valid at step 714, then the process goes to step 716 where it is determined whether the user's profile allows the user to access restricted content. If the user's profile indicates that the user is not allowed to access restricted content, then the user is denied access to the restricted content (step 708) and the process ends at step 710. If the user's profile indicates that the user is allowed to access restricted content, then the process goes to step 718 where the user is provided access to the restricted content. The process ends at step 710.

Figure 8:
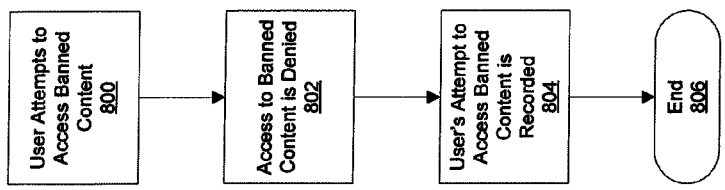
FIG. 8 is a flowchart for an exemplary process of a subscriber's attempt to access banned content.

FIG. 8 is a flowchart for an exemplary process of a subscriber's attempt to access banned content. The process starts at step 800 where a user attempts to access banned content. At step 802, the user is denied access to the banned content. At step 804, the user's attempt to access banned content is recorded, and the process ends at step 806.

Administrative Functions:

Administrative functions that may be performed on the AV/CF platform by an account holder or the carrier include an account holder accessing event logging (per access code or per account) from the carrier's web site or the account holder's handset. The carrier may manage content categories by adding new categories (e.g., "Teen"), changing/removing categories, sub-dividing an existing content category, re-mapping ratings into one or more categories (e.g., rolling PG-13 and T rated games into the "Teen" content classification). Furthermore, the carrier may view an access code (or list of access codes) for an account or delete an access code on behalf of the account holder. The carrier may also view a parental control report on behalf of an account holder, or reclassify a content item. Likewise, a user may submit information about a web site (or content item location) for re-rating by the carrier through the carrier's website or the user's handset. The carrier may add/modify/delete entries on the banned content list.

Reporting Functionality:

The AV/CF infrastructure platform is responsible for at least two types of statistical reports: network infrastructure internal measurement and operational errors; and carrier and third-party content providers.

Reports are generated by the AV/CF platform on-line via an authorized secure carrier website, and in an exportable CSV format for inclusion into an Excel spreadsheet. These metrics/attributes should also be accessible by the carrier's internal business groups such as Product, Business Development, Reporting/Analysis, Revenue Assurance, Data Cube, and Data Warehouse teams. Report metrics may be used for data mining/market research purposes to more closely understand the user activity on the AV/CF services.

Subscriber Information Reports:

Various managerial and operational reports may be generated from the AV/CF platform including: number of total active subscribers (defined as subscribers who have signed up for the service if we create a feature code, or have created an access code otherwise); number of subscriber service cancellations; number of new subscribers added; number of subscribers per service type (postpaid v. prepaid); number of users with the age verification feature code (if required); total number of active access codes created by subscribers; total revenue generated by the age verification service; revenue share per content provider (for premium content); revenue share due to the age verification vendor (if required); age verification revenue per type of product (BREW, video, etc.); blocked content requests per content type, per rating; successful access code validations per content type, per rating; access code approvals/validations per content type, per rating; account holder web report accesses per month; and number of access codes with adult access level.

Modifications and Alternative Embodiments

Many modifications and other embodiments will come to mind to one skilled in the art having the benefit of the teachings presented in the foregoing descriptions of the preferred embodiments. Accordingly, it should be understood that the invention is not to be limited to the specific embodiments described herein, but rather to the appended: claims, and that modifications and other embodiments are intended to be included within the scope of the appended claims. Although specific terms are employed herein, they are used in an inclusively descriptive sense only and not for purposes of limitation.

That which is claimed:

1. A method of recording a user's access or attempted access of content over a wireless handset, comprising:

maintaining a plurality of predefined content categories, the plurality of predefined content categories including universal, youth, teen, age-restricted, and banned, each of the plurality of predefined content categories specifying and mapped to one or more user-permissible ratings in a plurality of content types to define the one or more user-permissible ratings for a particular age group, the plurality of content types including two or more of video, music, audio, ring-back tones, games, applications, messaging, and chat sites, wherein each of the one or more user-permissible ratings is specific to a particular one of the plurality of content types, wherein each of the plurality of predefined content categories is selectable, wherein selection of a particular one of the plurality of predefined content categories results in the user being permitted access to content with the one or more user-permissible ratings of the particular one of the plurality of predefined content categories;

receiving an indication of one of the plurality of predefined content categories to assign to the user, the indication comprising a single selection of the one of the plurality of predefined content categories;

assigning the indicated one of the plurality of predefined content categories to the user;

receiving from the user a request to access certain content;

determining a content category of the certain content by following a mapping of a rating of the certain content to a corresponding one of the plurality of predefined content categories;

determining whether the user is allowed to access the certain content based upon the mapping of the certain content to the corresponding one of the plurality of predefined content categories and the indicated one of the plurality of predefined content categories assigned to the user;

if the user is allowed to access said certain content, then providing the user with access to the certain content via the wireless handset, the wireless handset displaying the certain content to the user, and recording the user's access to the certain content; and if the user is not allowed access to the certain content, then denying the user access to the certain content on the wireless handset and recording the user's request to access certain content.

2. The method of claim 1, wherein receiving from the user a request to access certain content comprises receiving a request to access banned content.

3. The method of claim 2, further comprising reporting to law enforcement agencies said user's request to access banned content.

4. A method of accessing restricted content via a wireless handset, comprising:

receiving from a user of an account, wherein the account can be accessed by multiple users, wherein one of the multiple users of the account is an account holder, and wherein the account relates to accessing content via the wireless handset, the wireless handset displaying the content to one or more of the multiple users, an attempt to access restricted content via the wireless handset, the content being restricted based upon a rating of the restricted content mapped to one or more predefined content categories that at least one user of the multiple users of the account is restricted from accessing, the one or more predefined content categories including universal, youth, teen, age-restricted, and banned, where each of the one or more predefined content categories specifies and is mapped to one or more user-permissible ratings in a plurality of content types to define the one or more user-permissible ratings for a particular age group, the plurality of content types including two or more of video, music, audio, ring-back tones, games, applications, messaging, and chat sites, wherein each of the one or more user-permissible ratings is specific to a particular one of the plurality of content types, wherein each of the one or more predefined content categories is selectable, wherein selection of a particular one of the one or more predefined content categories results in the user being permitted access to content with the one or more user-permissible ratings of the particular one of the one or more predefined content categories, where each user of the account is assigned to one of the one or more predefined content categories by a single selection of the one of the one or more predefined content categories;

determining whether the user has an access code to access the restricted content;

determining whether the user is the account holder of the account if the user does not have the access code;

providing the user with the access code if the user is the account holder;

if the user is not the account holder, denying the user access to the restricted content on the wireless handset;

receiving from the user the access code;

determining whether the access code is valid;

if the access code is not valid, denying the user access to the restricted content on the wireless handset; and providing the user access to the restricted content via the wireless handset if the access code is valid.

* * * * *